United States Patent [19]
Fields et al.

[11] 4,249,626
[45] Feb. 10, 1981

[54] LIQUID COOLING SYSTEM

[75] Inventors: Samuel Fields; Wesley J. Anderson, both of Minneapolis, Minn.

[73] Assignee: Kawasaki Motors Corp. U.S.A., Santa Ana, Calif.

[21] Appl. No.: 833,173

[22] Filed: Sep. 14, 1977

[51] Int. Cl.³ .............................................. B62D 27/00
[52] U.S. Cl. .................. 180/54 A; 180/68 R; 180/182; 165/47
[58] Field of Search .............. 180/69 R, 54 A, 68 R, 180/182; 165/44, 47; 237/181

[56] References Cited
U.S. PATENT DOCUMENTS

| 2,913,065 | 11/1959 | Lyon | 180/68 P UX |
| 4,008,777 | 2/1977 | Juto | 180/54 A X |

FOREIGN PATENT DOCUMENTS

| 610850 | 12/1960 | Canada | 180/54 A |
| 831597 | 3/1960 | United Kingdom | 180/54 A |

Primary Examiner—Alan Cohan
Attorney, Agent, or Firm—Dorsey, Windhorst, Hannaford, Whitney & Halladay

[57] ABSTRACT

A liquid cooling system for a snowmobile or other relatively small vehicle having a heat exchange element with front and rear surfaces and air passages extending therebetween, a plurality of air guides for providing a flow of air to the front surface of the heat exchanger and a duct for directing air flow from the rear surface of the heat exchanger upwardly through a portion of the vehicle hood. Preferably the heat exchange element is tipped to increase the flow of air therethrough during idling and at slow speeds.

2 Claims, 9 Drawing Figures

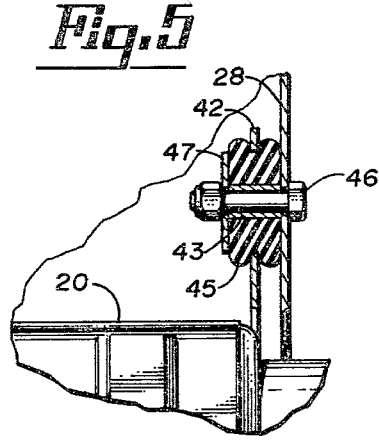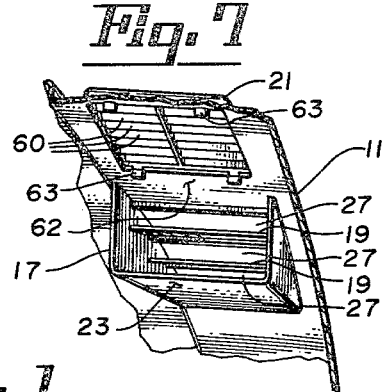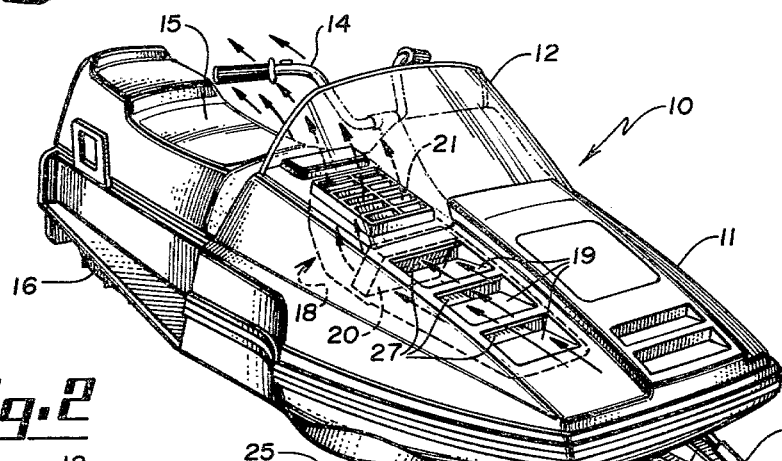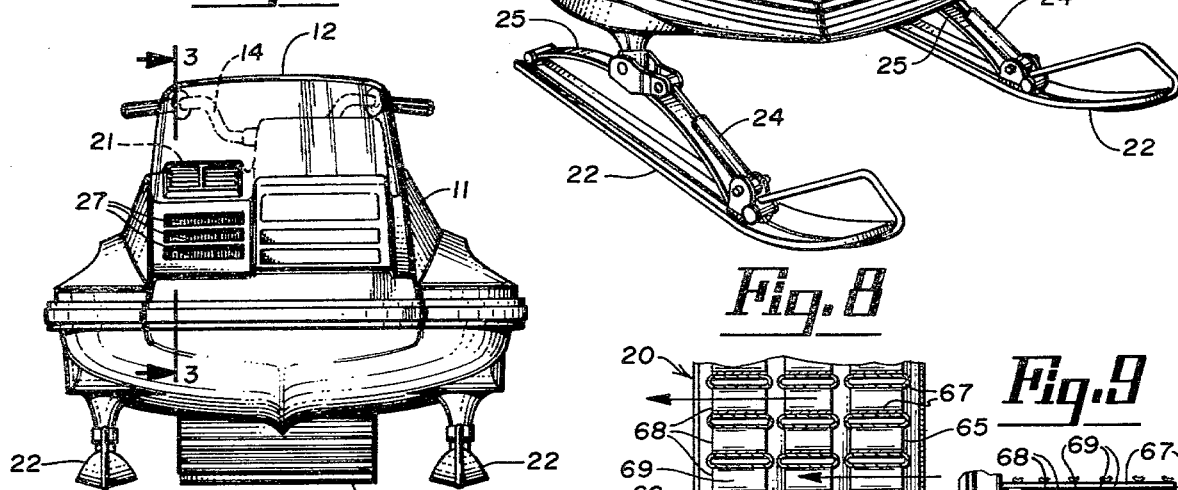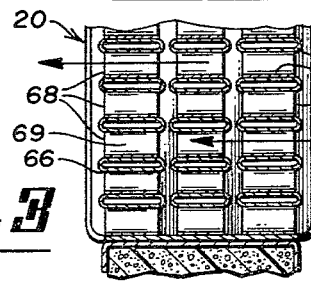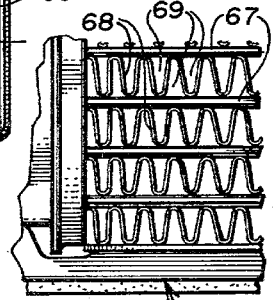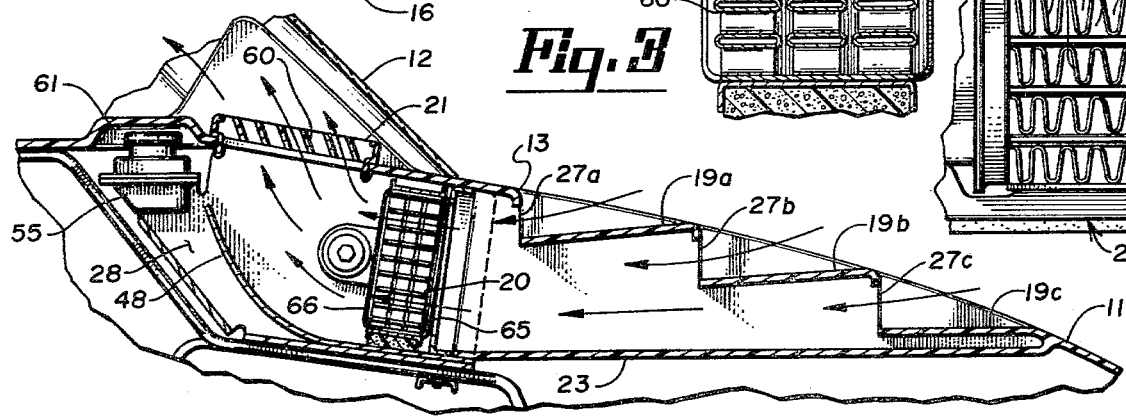

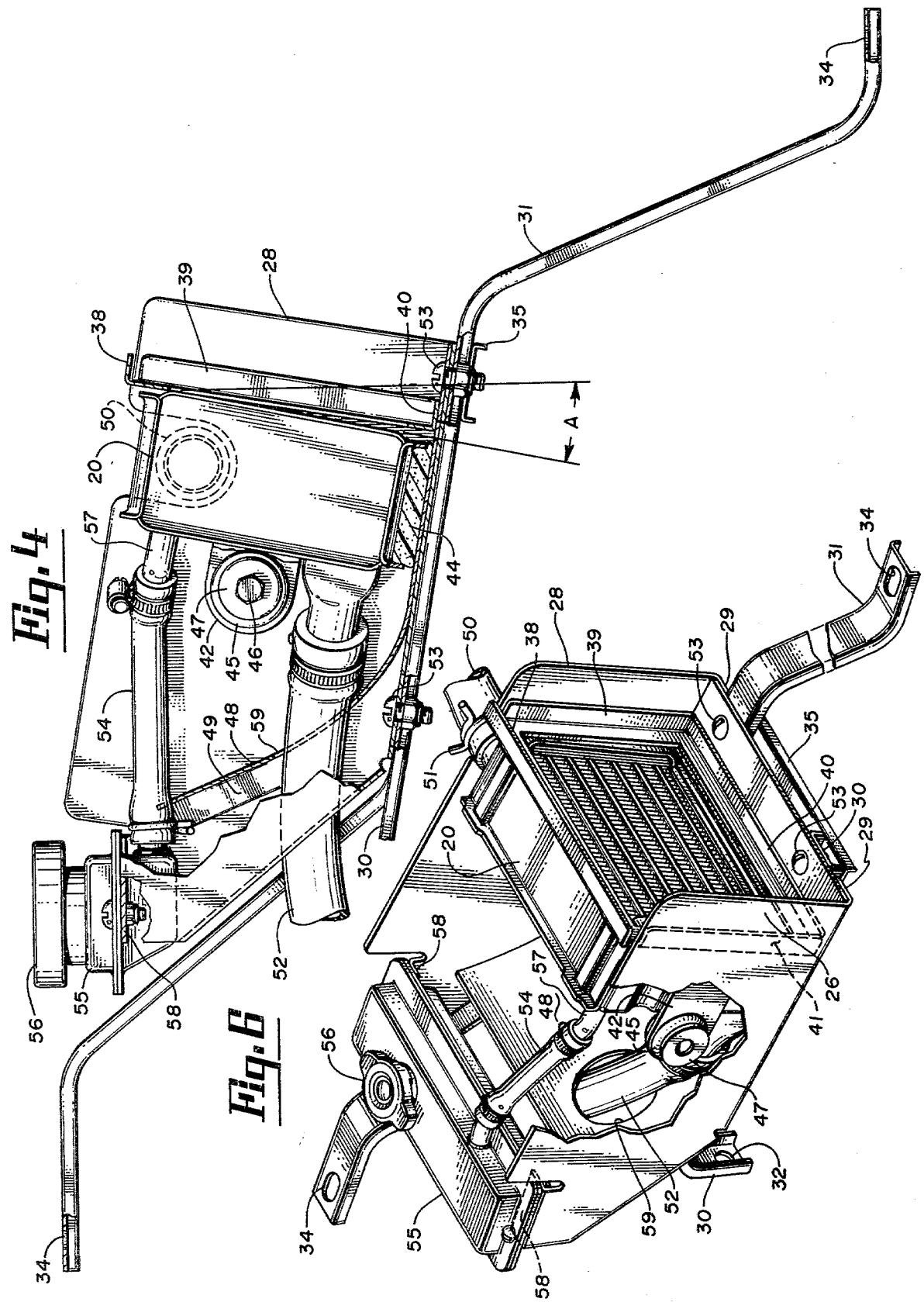

LIQUID COOLING SYSTEM

BACKGROUND OF THE INVENTION

The present invention relates generally to an improved liquid cooling system and more particularly, to an improved liquid cooling system for a snowmobile or other small vehicles.

Presently, many snowmobiles and other vehicles with relatively small internal combustion engines are air-cooled. The satisfactory performance of these vehicles with air-cooled systems depends largely on the volume of ambient air contacting the heat exchange elements. Some of these air-cooled systems have fans or other means for forcing the ambient air into contact with the heat exchange elements, but most rely upon movement of the vehicle to generate the necessary airflow. Although air-cooled systems with fans function quite satisfactorily, the provision of a fan or blower in a snowmobile or other small internal combustion engine vehicle is generally undesirable due primarily to the additional cost of the fan and the space needed to house such a fan. This latter factor is particularly pertinent in small vehicles such as snowmobiles, all-terrain vehicles, motorcycles, etc.

Most snowmobiles or other small vehicles having air-cooled systems without fans or other air forcing means function satisfactorily at higher speeds (in excess of 10-15 mph) since the air flow resulting from movement of machine at these speeds provides sufficient cooling of the engine. During idling, and at slow speeds (less than 10 mph), however, the air currents caused by movement of the machine are often insufficient, thus resulting in over heating of the engine.

Recently, several manufacturers have been using liquid cooling systems in snowmobiles and other small vehicles. In general these liquid cooling systems include a radiator element positioned generally vertically (perpendicular to the movement of the vehicle), a single air scoop for providing a flow of air to such radiator element, and an outlet duct for directing air from the radiator horizontally away from the machine. Although these machines, in some respects, are an improvement over the previous air-cooled machines, insufficient cooling problems are still encountered during idling of the vehicle and at relatively slow speeds. As with the air-cooled systems, these problems result from insufficient airflow over the radiator element. For the reasons discussed above, a real need exists in the art for an improved cooling system, and particularly a liquid cooling system, for a snowmobile or other small internal combustion engine vehicle to provide sufficient cooling of the engine during idling and at relatively low speeds.

SUMMARY OF THE INVENTION

In contrast to the prior art, the present invention relates to a liquid cooling system for a snowmobile or other relatively small internal combustion engine vehicle which requires no cooling fan and which provides improved cooling of the engine during idling of the engine and at relatively slow speeds. In addition, the liquid cooling system of the present invention provides heat for the vehicle operator and provides means for isolating the cooling system from the noise and vibration of the engine.

Specifically, the liquid cooling system of the present invention includes a liquid cooled radiator element disposed near the forward portion of the vehicle at a point between the forward end of the vehicle and the passenger area. Preferably such radiator element should be tilted in a manner such that the lower portion of the radiator element is disposed further rearwardly along the vehicle than the top portion. As a result of such tilting, the warm air from the radiator element tends to rise, thereby creating a negative pressure causing increased flow of air through the radiator element. Means is also provided in the form of a plurality of air guides at the forward end of the vehicle for directing ambient air to the radiator element. The plurality of air guides create relatively laminar flow of air to the radiator element to increase the airflow therethrough. Means are also provided for directing the flow of air from the radiator element and away from the vehicle. This means is in the form of an outlet duct which is curved to direct the flow of air from the tilted radiator generally upwardly through a panel vent and away from the vehicle. As a result of this particular structure, the warm air in the duct tends to rise thereby creating additional negative pressure and causing additional flow of air through the radiator element. The cooling system is positioned so that the flow of air over the windshield during movement of the vehicle causes additional negative pressure to further increase the flow of air through the radiator element.

The result of the above described structure is an improved liquid cooling system which creates sufficient convection of air through the radiator element during idling and at relatively slow speeds (less than 10 mph). This increased flow is due in part to the fact that the radiator is tipped, in part to the fact that the air from the radiator is directed upwardly for exit from the vehicle and in part to the fact that the plurality of air guides provides a relatively laminar flow of air to the radiator element.

Accordingly, a primary object of the present invention is to provide an improved liquid cooling system for a snowmobile or other small vehicle which, in addition to providing satisfactory cooling at high speeds, is capable of providing acceptable cooling during idling and at relatively slow speeds.

Another object of the present invention is to provide an improved cooling system for a snowmobile or other small vehicle in which the radiator element is tipped to allow increased convection of air from the radiator element due to the tendancy of warm air to rise.

A further object of the present invention is to provide a liquid cooling system for a snowmobile or other small vehicle in which the airflow from the radiator element is directed upwardly for exit from the vehicle.

Another object of the present invention is to provide an improved liquid cooling system with means for guiding ambient air to the radiator element.

A further object of the present invention is to provide an improved liquid cooling system with a plurality of air guides for guiding ambient air in relatively laminar flow to the radiator element.

Another object of the present invention is to provide an improved cooling system for a snowmobile or other small vehicle which is isolated from the engine noise and vibration by appropriate mounting means.

These and other objects of the present invention will become apparent with reference to the description of the preferred embodiment, the drawings and the appended claims.

DESCRIPTION OF THE DRAWINGS

FIG. 1 is a pictorial view of a snowmobile embodying the liquid cooling system of the present invention.

FIG. 2 is a front view of a snowmobile showing a portion of the liquid cooling system of the present invention incorporated therein.

FIG. 3 is a sectional view of the liquid cooling system of the present invention as taken along the section line 3—3 of FIG. 2.

FIG. 4 is a sectional view of a portion of the liquid cooling system of the present invention.

FIG. 5 is a sectional view showing the manner in which the radiator element is mounted to the cooling system housing.

FIG. 6 is a pictorial view of a portion of the liquid cooling system of the present invention showing the manner in which such system is mounted to the vehicle and showing connections for the circulating liquid coolant.

FIG. 7 is a pictorial view of the underside of the snowmobile hood showing the air guide means and housing.

FIG. 8 is a sectional view of the radiator or heat exchange element.

FIG. 9 is a front view of a portion of the radiator or heat exchange element.

DESCRIPTION OF THE PREFERRED EMBODIMENT

General reference is first made to FIGS. 1 and 2 which show various views of a conventional snowmobile 10 with the liquid cooling system of the present invention incorporated therein. It should be noted that although the cooling system described in the preferred embodiment is installed in a snowmobile, it can be used in other small vehicles such as all terrain vehicles, motorcycles, boats, etc. in which a fan is not practical or possible due to lack of space or insufficient engine power. The snowmobile 10 includes a front hood portion 11, a windshield section 12 extending generally upwardly and rearwardly from a portion of the front hood, a steering assembly 14 and a seat 15 for the passenger. The snowmobile 10 is also provided with a conventional endless track means 16, a pair of skis 22 and appropriate connecting elements in the form of the shock absorbers 24 and the leaf springs 25 for connecting the skis 22 to the body of the snowmobile.

The snowmobile 10 also includes an improved liquid cooling system which is illustrated with broken lines in FIG. 1 by the general reference numeral 18. As further illustrated, the liquid cooling system 18 includes a radiator element or heat exchanger 20, means in the form of a plurality of air guides 19 for providing ambient air to the forward face of the radiator element 20 and a means for directing air from the rearward face of the radiator element 20 generally upwardly through the panel vent 21.

With general reference to FIGS. 1 and 3 and more specific reference to FIGS. 4 and 6, the liquid cooling system 18 is shown as including a generally rectangular radiator element 20 positioned between a pair of side housing elements 26 and 28. Each of the sidehousing elements 26 and 28 includes a lower flange 29 extending inwardly from its lower edge at approximately right angles for connection with the mounting braces 30 and 31. The brace 30 is connected to the lower flange 29 of the side 26 by a plurality of threaded bolts or other connecting means 53 and is provided with a hole 32 for appropriate connection to a portion of the snowmobile body. The brace 31 is similarly connected to the bottom surface of the flange 29 of the side 28 by a plurality of threaded bolts or other connecting members 53 and is provided with a hole 34 at each of its ends for appropriate connection with a portion of the vehicle body. A cross brace member 35 extends between the brace members 30 and 31 to provide additional support for the housing.

As illustrated best in FIGS. 4 and 6, a plurality of angle members 38, 39, 40 and 41 are connected with the side housing elements 26 and 28 to provide further support for and rigidity to such housing elements and to provide a mating surface for the air guide assembly which will be discussed below. The brace members 38-41 may be connected with the sides 26 and 28 by welding or other appropriate means.

The radiator or heat exchanger element 20 is disposed between the two side housing elements 26 and 28 and is mounted to them. Specifically, as illustrated in FIGS. 4, 5 and 6, each side of the radiator 20 includes a mounting flange 42 extending rearwardly therefrom. Each of these flanges 42, and therefore the radiator element 20, is connected with the side elements 26 and 28 by the connection assembly illustrated in FIG. 5. This assembly includes a nut and bolt 46, a bushing 43 disposed on the outside of the bolt 46, a rubber grommet 45 disposed between the bushing 43 and the mounting flange 42 and a metal washer 47 disposed between a surface of the grommet 45 and the nut of the bolt assembly 46. The radiator element 20 is further supported and cushioned by the radiator pad or element 44 disposed between a portion of the baffle 48 and the bottom of the radiator 20.

As shown best in FIG. 4, the radiator 20 is tilted by rotating it in a clockwise direction as viewed in FIG. 4. With this construction, the top portion of the radiator is tilted forwardly and the bottom portion tilted rearwardly. The inventors have found that tilting the radiator element 20 in this manner results in an increased flow of air therethrough. It is believed that this increased airflow is a result of the warm air on the back side of the radiator element 20 tending to rise, therefore creating a negative pressure and causing flow of air through the element 20. It has been found that in general, the more the radiator 20 is tipped, the greater the flow of air through the element 20 at idling or slow speeds.

As the element 20 is tipped, however, the frontal surface area of the element 20 is reduced. Accordingly, for optimum operation, the radiator element 20 should be tipped to provide some additional flow of air through the element 20, but it should not be tipped to the point where it significantly reduces the frontal surface area on the front side of the radiator. As illustrated in FIG. 4, the angle "A" defines the angle at which the radiator is tipped from the vertical. It has been found that during idling, the radiator 20 should preferably be tipped so that the angle "A" is about 45°. This results in maximum convection airflow through the element 20. When the snowmobile is moving, however, tipping of the radiator 45° substantially reduces the frontal area of the radiator. Accordingly, the inventors have found that an angle "A" of at least 5°, and preferably of approximately 10° is acceptable for good overall functioning of the liquid cooling system of the present invention under all conditions of operation. It should be noted that the tipping of the radiator 20 can be accomplished either by tipping the element 20 relative to the side elements 26 and 28 or by tipping the entire housing in the desired direction. In the preferred embodiment, both the liquid cooling system housing and the radiator 20 are tipped in the desired direction.

The radiator element 20 utilized in the present invention should be a liquid-to-air type of radiator in which the circulating fluid is a liquid and the cooling fluid is ambient air. As shown in FIGS. 8 and 9, such a radiator or heat exchange element generally includes a plurality of tubes 67 for circulating the liquid or coolant through the system, generally parallel front and rear surface areas, 65 and 66, respectively and a plurality of air passages 69 extending between the surfaces 65 and 66 enabling the flow of air through the heatexchanger in a direction generally perpendicular to such surfaces. The element 20 also includes a plurality of corrugated fins 68 to provide a heat exchanging surface area for contact by the air flow.

Disposed between the side housing elements 26 and 28 is a baffle 48 which extends from the forward end of the elements 26 and 28 rearwardly, below the radiator 20 and then upwardly as illustrated best in FIGS. 3, 4 and 6. The baffle 48 is secured to the housing at its forward end by a pair of threaded screws 53 extending through the baffle 48, the flange 29 and the braces 35 and 31 or 30. The rearward portion of the baffle 48 includes a flange portion 49 on each side thereof for connection by welding to the inside surfaces of the side housing memebers 26 and 28. The baffle 48 includes an opening 59 through which the radiator hose 52 extends. As shown, the rearward portion of the baffle 48 curves upwardly to direct warm air flowing from the radiator 20 generally upwardly through the panel vent 21 (FIG. 3).

The radiator 20 includes an inlet hose 50 secured to the inlet connector of the radiator by an appropriate hose clamp 51 and an outlet hose 52 which is similarly connected to an outlet connector from the radiator 20 by an appropriate hose connector. The radiator 20 is also provided with an overflow connector 57 connected by an appropriate connecting hose 54 to a reservoir tank 55. The reservoir tank 55 includes a filling cap 56 and is connected by a pair of threaded bolts to a pair of flanges 58 extending inwardly from the side elements 26 and 28.

The present invention also includes an air guide assembly for guiding air to the frontal surface of the radiator element 20 along a generally horizontal path substantially parallel to the forward movement of the vehicle. As illustrated in FIGS. 1, 3 and 7, such assembly includes a plurality of air guides defined by a plurality of air guide fins or surfaces 19a, 19b and 19c. Preferably the air guide surfaces 19a-c should be as nearly parallel to the forward movement of the vehicle as possible in order to result in generally laminar flow of air to the radiator element 20. As illustrated in the preferred embodiment, the air guide surface 19c is generally parallel to the forward movement of the vehicle while the air guide surfaces 19a and 19b are sloped slightly downwardly about 5° for aesthetic reasons, although each is still sufficiently parallel to the forward movement of the vehicle to satisfactorily direct air to the element 20 in laminar flow. If the surfaces 19a and 19b were significantly sloped, the air would be directed downwardly to the lower portion of the radiator 20 causing an increase in velocity and generally turbulent conditions. It has been found that turbulent flow of air to the frontal surface area of the radiator element 20 results in less efficient flow of air through the radiator than if the flow to the frontal surface is laminar.

Each of the air guide surfaces 19a-c is integrally formed with the air guide housing 23 (FIGS. 3 and 7) which in turn is integrally formed with a portion of the snowmobile hood 11. The housing 23 defines an air guide passage through which air guided by the surfaces 19a-c can flow to the radiator element 20. The rearward end 17 of the housing 23 is designed to mate with a portion of the radiator housing so that air guided through the housing 23 is forced through the radiator 20. As illustrated best in FIG. 3, the housing 23 includes a lower air guide surface extending generally parallel to the forward movement of the vehicle and generally between the lower edge of the heat exchange element 20 and the forward surface or hood 11 of the vehicle. The air guide surfaces 19a-c together with the housing 23 form a plurality of air guide openings 27a, 27b and 27c enabling ambient air to flow into the air guide housing 23.

It has been found that at least two, and preferably three, air guide openings 27 and air guide surfaces 19 should be utilized in order to provide a sufficiently laminar flow to the frontal surface area of the radiator 20. It is also preferable that each of the air guide surfaces 19a-c be sufficiently long to guide the incoming air into laminar flow. In this respect, the upper surface of element 19c and both the upper and lower surfaces of 19a and 19b serve to guide and direct air toward the radiator 20. Although the length of the members 19a-c can vary, it is preferable if the rearward edge of each of the surfaces 19a-c extends at least to about the forward end of the rearwardly adjacent element 19. In other words, the rearward end of the surface 19a should extend at least about to the forward edge of the hood 13, the rearward end of the surface 19b should extend at least about to the forward end of the surface 19a and the rearward edge of the surface 19c should extend at least about to the forward edge of the surface 19b. In the preferred embodiment, as illustrated best in FIGS. 1 and 3, each of the air guide surfaces 19a, 19b and 19c is spaced vertically with respect to each other and each is displaced from an adjacent air guide surface along an axis generally parallel to the forward movement of the vehicle.

Referring to FIGS. 1, 2, 3 and 7, a panel vent 21 is disposed in a portion of the hood 11 to allow warm air passing through the radiator 20 to exit from the vehicle. The panel vent 21 includes a plurality of louvered elements 60 with openings therebetween to allow the air to flow through the vent 21. In the preferred embodiment, the panel vent 21 is secured to the hood 11 by a plurality of snap elements 63 (FIG. 7). Means are also provided for creating a negative pressure or suction in the area of the vent 21 as a result of movement of the vehicle. This is necessary to insure sufficient convection flow of air through the cooling system. In the preferred embodiment, this means comprises the windshield 12 which is connected with a portion of the hood 11 and, as best illustrated in FIGS. 1 and 3, extends upwardly and rearwardly over a substantial portion of the panel vent 21. This particular construction causes airflow over the top of the windshield when the vehicle is moving, thus creating negative pressure or suction below the windshield area. This results in increased flow through the cooling system. If the vehicle does not have a windshield, some other means extending upwardly and rearwardly over the vent 21 should be present to create such negative pressure. In the preferred embodiment, the panel vent 21 directs the heated air upwardly from the vehicle and into the area defined generally by the windshield 12.

The operation of the liquid cooling system of the present invention can be understood best with references to FIGS. 1 and 3. During idling of the snowmobile engine, no flow of air through the cooling system is caused by forward movement of the vehicle. However, warm air created by the heated radiator element 20 tends to flow upwardly through the panel vent 21 as illustrated by the arrows in FIG. 3. This upward flow of warm air is increased because of the rearward tilt of the radiator. Such upward movement of air tends to draw cool ambient air toward the frontal surface of the radiator 20 through the air guide openings 27a-c. Thus, even while idling, the present system provides movement of cool air through the radiator element. When the vehicle 10 is moving in a forward direction, ambient air is guided by the guide surfaces 19a-c through the guide openings 27a-c and through the air guide housing 23 into communication with the frontal area of the radiator 20. This air passes through the radiator element 20 and exits upwardly through the panel vent 21. At generally high speeds (in excess of 10-15 mph), the flow of air through the radiator 20 caused by movement of the vehicle is sufficient to cool the engine. At slower speeds (0-10 mph), the flow of air through the radiator 20 resulting from forward movement of the vehicle is aided by the tendancy of the warm air to rise from the tilted radiator 20. Additionally, during movement of the vehicle, passage of air over the windshield 12 creates a negative pressure beneath the windshield in the area of the panel vent 21, thereby causing additional suction of air through the cooling system. A further advantage of the present system and its position is that the warm air which exits through the panel vent 21 warms the rider.

Although the description of the preferred embodiment has been quite specific, it is contemplated that various modifications could be made to the structure of the present invention without deviating from the spirit thereof. Accordingly, it is intended that the scope of the present invention be dictated by the appended claims, rather than by the description of the preferred embodiment.

We claim:

1. A liquid cooling system for a snowmobile having a front hood and a windshield extending generally upwardly and rearwardly from a portion thereof comprising:

a heat exchange element having a front surface area and a rear surface area and air flow passage therebetween and positioned so that said front surface area generally faces the forward end of said snowmobile said heat exchange element being tipped from the vertical at an angle of at least 5° but less than 45° so that the lower edge of said heat exchange element is disposed rearwardly of the upper edge;

means for providing air flow to said front surface of said heat exchange element along a path substantially parallel to the forward movement of the snowmobile, said means including a first air guide surface extending generally parallel to the forward movement of the snowmobile and generally between the lower edge of said heat exchange element and a forward surface of the snowmobile and a plurality of vertically spaced second air guide surfaces disposed forward of said front surface and extending generally parallel to the forward movement of the snowmobile; and a generally horizontally disposed vent wherein said vent is disposed within a portion of said hood and to the rear of said windshield;

means for directing air flow from said rear surface area of said heat exchanger in a generally upward direction including a baffle element extending from the lower edge of said heat exchange element and curving upwardly and a duct extending from the perimeter of said rear surface area and curving upwardly to said vent.

2. The liquid cooling system of claim 1 wherein said vent is positioned forward of the passenger area of said vehicle.

* * * * *